United States Patent
Artelsmair et al.

(10) Patent No.: US 7,256,368 B2
(45) Date of Patent: Aug. 14, 2007

(54) WELDING AND TACK WELDING METHOD INVOLVING THE USE OF A NON-FUSING ELECTRODE

(75) Inventors: Josef Artelsmair, Wartberg/Krems (AT); Bernhard Mörtendorfer, Ried im Traunkreis (AT)

(73) Assignee: Fronius International GmbH, Pettenbach (AT)

( * ) Notice: Subject to any disclaimer, the term of this patent is extended or adjusted under 35 U.S.C. 154(b) by 176 days.

(21) Appl. No.: 10/510,430

(22) PCT Filed: Mar. 18, 2003

(86) PCT No.: PCT/AT03/00076

§ 371 (c)(1),
(2), (4) Date: Oct. 6, 2004

(87) PCT Pub. No.: WO03/084705

PCT Pub. Date: Oct. 16, 2003

(65) Prior Publication Data

US 2005/0173391 A1   Aug. 11, 2005

(30) Foreign Application Priority Data

Apr. 10, 2002 (AT) ............... A 553/2002

(51) Int. Cl.
   *B23K 9/09* (2006.01)
   *B23K 9/007* (2006.01)
(52) U.S. Cl. .................. 219/130.51; 219/127
(58) Field of Classification Search .......... 219/137 PS, 219/130.51, 130.4, 127
   See application file for complete search history.

(56) References Cited

U.S. PATENT DOCUMENTS 3,781,511 A * 12/1973 Rygiol .................. 219/137 PS (Continued)

FOREIGN PATENT DOCUMENTS

DE   4418864   12/1995

(Continued)

OTHER PUBLICATIONS

Aendenroomer A J R et al: "Weld Pool Oscillation as a Tool for Penetration Sensing During Pulsed GTA Welding" Welding Journal, American Welding Society, Miami, US, vol. 77, NR. 5 pp. 18-S-87S XP000831416 ISSN: 0043-2296 The Whole Document. (enclosed).

*Primary Examiner*—Clifford C. Shaw
(74) *Attorney, Agent, or Firm*—Collard & Roe, P.C.

(57) ABSTRACT

The invention relates to a welding method involving the use of a non-fusing electrode (12) according to which the electrode (12) is provided with power from a power source once the arc (11) between the electrode (12) and the workpieces (13, 14) to be joined has been ignited. The invention also relates to a tack welding method. The aim of the invention is to improve the quality of the weld seam in the starting phase of the welding process. To this end, the invention provides that before the actual welding process, a start program (22) is performed without the introduction of a filler material during which the electrode (12) is supplied with pulsed power in the form of current or voltage pulses over a presettable length of time (23) whereby causing the liquid molten bath to oscillate or vibrate, and that after the execution of the start program (22), the actual welding process is carried out during which the electrode (12) is preferably supplied with constant power.

12 Claims, 2 Drawing Sheets

U.S. PATENT DOCUMENTS 3,864,542 A * 2/1975 Fletcher et al. ........ 219/137 PS
6,107,602 A * 8/2000 Geissler et al. .......... 219/130.4

FOREIGN PATENT DOCUMENTS

| | | |
|---|---|---|
| EP | 1 492 641 | 1/2005 |
| GB | 2038687 | 7/1980 |
| JP | 55 054273 | 4/1980 |
| JP | 56 009060 | 1/1981 |
| JP | 06 218546 | 8/1994 |
| JP | 2001 198677 | 7/2001 |
| JP | 2001239365 | 9/2001 |
| SU | 1592138 | 9/1990 |
| WO | WO 95 34400 | 12/1995 |

* cited by examiner

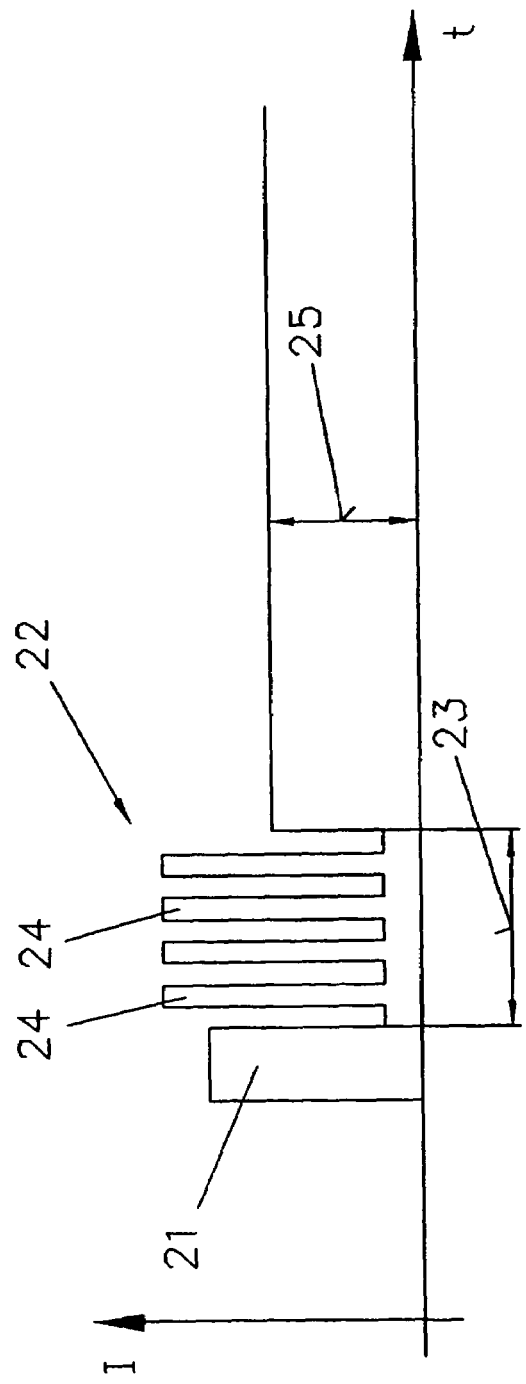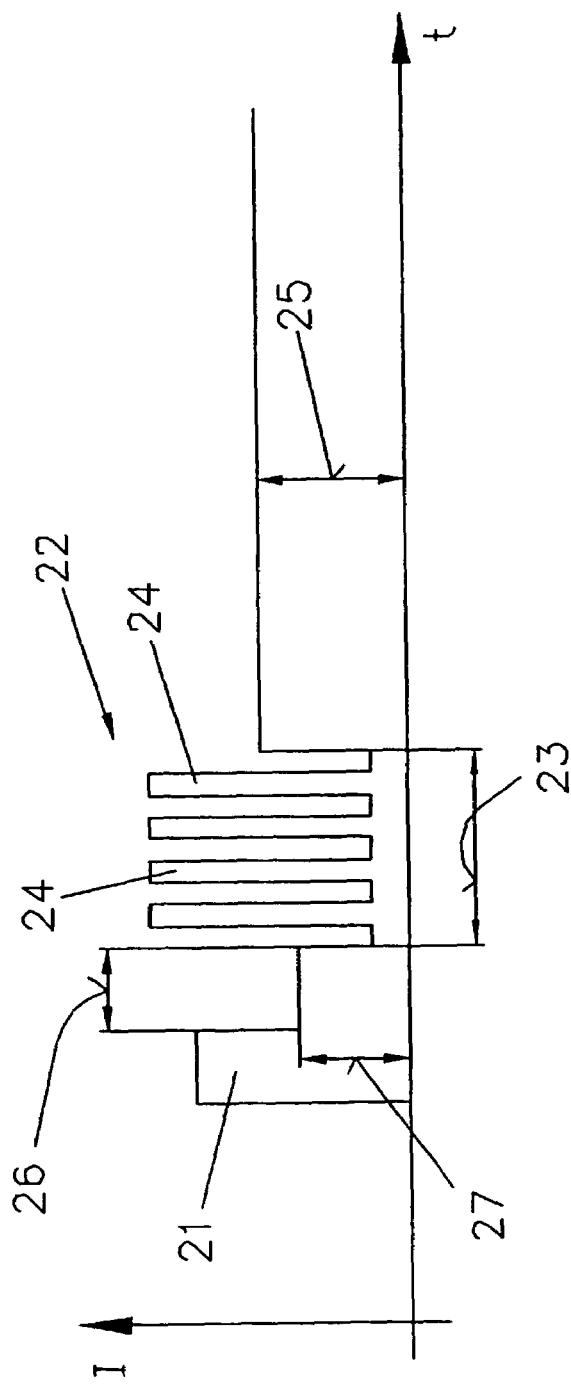

WELDING AND TACK WELDING METHOD INVOLVING THE USE OF A NON-FUSING ELECTRODE

CROSS REFERENCE TO RELATED APPLICATIONS

Applicants claim priority under 35 U.S.C. §119 of Austrian Application No. A553/2002 filed Apr. 10, 2002. Applicants also claim priority under 35 U.S.C. §365 of PCT/AT03/00076 filed Mar. 18, 2003. The international application under PCT article 21(2) was not published in English.

BACKGROUND OF THE INVENTION

The invention relates to a welding method using a non-consumable electrode, in which the electrode is supplied with energy from a power source after the ignition of an electric arc between the electrode and the workpieces to be joined.

Furthermore, the invention relates to a tack welding method using a non-consumable electrode and without introduction of any additional material, in which the electrode is supplied with energy from a power source after the ignition of an electric arc between the electrode and the workpieces to be joined.

Various welding methods have already been known, in which the electrode is supplied with energy from a power source after the ignition of an electric arc between the electrode and the workpieces to be joined, thus causing the workpieces to fuse together. For the ignition of the electric arc, different ignition processes and, in particular, contact ignition or HF ignition may be employed.

SUMMARY OF THE INVENTION

The invention is based on the object of providing a welding method using a non-consumable electrode, and a tack welding method using a non-consumable electrode and without introduction of any additional material, by which the quality of the weld is improved in the start phase of the welding process.

This object of the invention is achieved in that, prior to the welding process proper, i.e., after the ignition of the electric arc, a start program is performed without introduction of an additional material, by which the electrode is supplied with pulsed energy in the form of current or voltage pulses over a presettable period of time, thus causing the liquid melt bath to oscillate or vibrate, and that the welding process proper is carried out after termination of the start program.

In the welding process proper, the electrode is preferably supplied with constant power.

Furthermore, the object of the invention is also achieved by a tack welding method as mentioned above, wherein, prior to the welding process proper, a start program is performed, by which the electrode is supplied with pulsed energy in the form of current or voltage pulses over a presettable period of time, thus causing the liquid melt bath to oscillate or vibrate, and that the welding process proper is carried out after termination of the start program by supplying the electrode with constant power.

By carrying out said special start program and, in particular, a socalled tacking process, it is ensured that the melt bath produced will be set in vibration and the flowing together of the melt baths of the two workpieces will be facilitated by the vibration of the melt bath. This is of particular relevance to the extent that no additional material in the form of a welding wire is introduced into the melt bath, but the weld seam is merely formed by the fused material, thus rendering impossible any filling up of the weld seam with an additional material. In such welding methods without introduction of any additional material weld holes are, thus, prevented from forming at the beginning of the welding process and it is feasible from the very beginning of the welding process to form a constant weld without any weld holes. If an electric arc is ignited in conventional prior-art welding methods, the fused material of the workpieces will, in fact, be pressed apart by the energy introduced and will solidify. In doing so, a weld hole may form, or the weld may have a smaller weld thickness in its central region, at the beginning of the welding process. This is actually avoided by the start program, by which the melt bath is set in vibration due to the introduction of pulsed energy, as the melt bath is not permanently subjected to constant power introduction.

Furthermore, very short welds can be produced on account of the start program, since a complete formation of the weld seam is obtained from the very beginning of the welding process, i.e., immediately upon ignition of the electric arc, thus enabling the length of the weld seam to be kept very short. This is of particular advantage if aluminum is used as the material of the workpieces to be welded, since no distortion of the material due to slighter heating in the event of short welds will occur.

By the solution according to the invention considerable enlargement of the bridging of the clearance between the workpieces to be welded is also reached, because the oscillating melt baths forming of the workpieces ensure an enhanced flowing together of the workpieces.

The introduction of energy during the start program can be controlled in a manner that the mean value of the pulsed energy corresponds with the amplitude of the welding current set for the subsequent constant-energy welding process proper. The start program may, thus, be readily adapted to the subsequent welding process proper.

The parameters of the start program and, in particular, the pulse parameters like pulse height, pulse width, pulse frequency, pulse break and, possibly, curve shape are advantageously freely settable at the power source.

It is also feasible that the parameters of the start program, by a control and/or evaluation device provided in the welding apparatus or in the power source, are automatically fixed or varied as a function of the parameters of the welding process proper.

In this respect, it is, for instance, possible that the parameters of the start program are automatically fixed or varied as a function of the amplitude of the welding current used for the welding process proper.

It is also feasible that the parameters of the start program are automatically fixed or varied as a function of the material thickness and/or material of the workpieces to be welded or further parameters of the welding process proper.

Finally, also several start programs having different parameters or curve shapes can be defined and stored, and said defined and stored start programs are used and/or varied by the control and/or evaluation device to select the parameters for the start program.

The start program, during which the electrode is supplied with pulsed energy over a presettable period of time, can also be carried out for a presettable period of time after the ignition of the electric arc.

During said presettable period of time after the ignition of the electric arc, the electrode is preferably supplied with constant power.

If the electrode, during the presettable period of time after the ignition of the electric arc, is supplied with constant power different from that supplied during the welding process proper, it will be ensured that the electric arc will be stabilized during the period between the ignition of the electric arc and the beginning of the start program, prior to the initiation of the start program and, after this, the welding process proper.

BRIEF DESCRIPTION OF THE DRAWINGS

In the following, the invention will be described in more detail by way of exemplary embodiments.

FIG. 2 in a simplified, schematic illustration represents the time course of the welding current during an embodiment of a welding process;

FIG. 3 in a simplified, schematic illustration represents a further time diagram of the welding current during another welding process.

DETAILED DESCRIPTION

Figure 1:
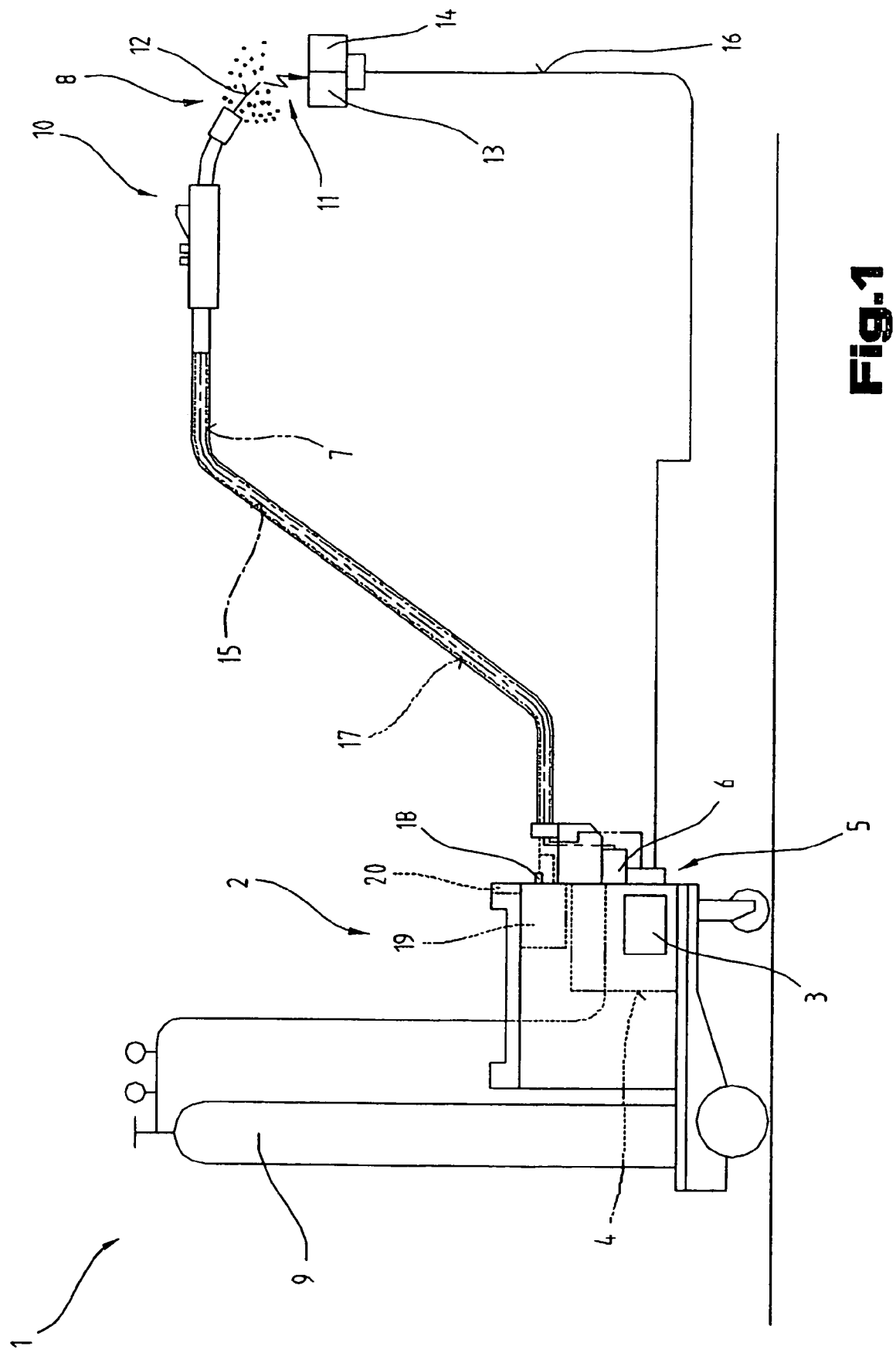
FIG. 1 is a schematic illustration of a welding apparatus.

FIG. 1 depicts a welding plant or welding apparatus 1 for various welding methods such as, e.g., WIG/TIG welding or electrode welding methods. It is, of course, possible to use the solution according to the invention with a power source or a welding current source.

The welding apparatus 1 comprises a welding current source 2 including an output part 3, a control and/or evaluation device 4 and a switching member 5 associated with the output part 3 and the control and/or evaluation device 4, respectively. The switching member 5 and the control and/or evaluation device 4, respectively, are connected to a control valve 6 arranged in a supply line 7 for a gas 8, particularly a protection gas such as, for instance, argon or helium or the like, provided between a gas reservoir 9 and a welding torch 10.

The energy and, in particular current, for building up an electric arc 11 between an electrode 12 and the workpieces 13, 14 to be joined is supplied from the output part 3 of the welding power source 2 to the welding torch 10 and electrode 12 via a welding line 15, wherein the workpieces 13, 14 to be welded are likewise connected with the welding apparatus 1 and, in particular, welding current source 2 via a further welding line 16 so as to enable an electric circuit to build up via the electric arc 11.

In order to provide cooling to the welding torch 10, the welding torch 10 is connectable with a fluid reservoir and, in particular, water reservoir 19 via a cooling circuit 17 with a flow control 18 interposed, whereby the cooling circuit 17 and, in particular, a fluid pump used for the fluid contained in the water reservoir 19 is started as the welding torch 10 is put into operation, thus effecting cooling of the welding torch 10.

The welding apparatus 1 further comprises an input and/or output device 20, via which the most different welding parameters or modes of operation of the welding apparatus 1 can be set. In doing so, the welding parameters set via the input and/or output device 20 are transmitted to the control and/or evaluation device 4, which in turn will subsequently activate the individual components of the welding apparatus 1.

It is, of course, possible to arrange all lines leading from the welding apparatus 1 to the welding torch 10 in a common hose package (not illustrated) and consequently connect said hose package with the welding torch 10 and the welding apparatus 1 via a central connection.

In FIGS. 2 and 3, time courses of the welding current for a welding method are schematically illustrated, the current I being plotted on the ordinate and the time t being plotted on the abscissa. It should be mentioned that the solution according to the invention is basically applicable to any welding technique known from the prior art and, in particular, alternating-current welding processes, a direct-current welding method, however, being described in the exemplary embodiment illustrated.

The exemplary embodiment described features a welding process in which no additional material, particularly no welding wire, is introduced into the welding process. The weld (not illustrated) is merely formed by the fused material of the workpieces 13, 14. Such a welding process without any additional introduction of a consumable welding wire uses a non-consumable electrode 12, from which the electric arc 11 is built up towards the workpieces 13, 14. It is exactly the start phase of a welding process, i.e., after the ignition process for the electric arc 11, which frequently involves problems during the formation of the weld, because the introduction of energy into the melt bath causes the latter to be pressed apart, which might lead to the formation of socalled weld holes, or very thin weld seams. This is actually avoided by the new method described below.

Welding processes of this type are, for instance, used in tack welding. The tack welding method is realized with a non-consumable electrode 12 and without introduction of any additional material, whereby two workpieces 13, 14, particularly sheet metal plates, are welded together, preferably on their abutting surfaces or in an overlapping manner, while merely effecting a fusion of the workpieces 13, 14 via the electric arc 11. In doing so, the electrode 12, after the ignition of the electric arc 11, is supplied during the welding process by the welding power source 1 with constant power and, in particular, direct current or direct voltage adjusted via the input and/or output device 20 prior to the welding process. The ignition of the electric arc 11 (schematically illustrated by an ignition pulse 21) may be effected in various known ways, i.e., for instance, through contact ignition or HF ignition, which will thus not be explained in more detail. It is merely indicated that, in accordance with the diagrams, HF ignition was effected in this exemplary embodiment, the ignition of the electric arc 11 by an ignition pulse 21 being apparent from the power curve.

At the onset of the welding process, i.e., after the ignition of the electric arc 11, the solution according to the invention provides a start program 22, particularly a tacking process, before the welding process proper, particularly a direct-current welding process, during which start program the electrode 12 is supplied with pulsed energy over a presettable period of time 23. During the start program 22, the electrode 12 is fed with current pulses 24 and/or voltage pulses. After termination of the start program 22, i.e., upon expiration of the period 23, the electrode 12 is supplied with constant power, particularly with a set current intensity 25, as a function of the desired welding process proper.

Due to the pulsed energy supply during the start program 22, it is ensured that the liquid melt bath is set in oscillation or vibration, thus preventing the melt bath from flowing apart during the start phase of the welding process. On account of the oscillating or pulsating melt bath of the workpieces 13, 14, renewed flowing together of the melt bath is constantly achieved. It is, thus, ensured from the very beginning of the welding process that no welding holes will form and the weld seam will exhibit an accordingly large weld thickness. Thus, even very short welds as are desired in tack welding can be produced.

According to FIG. 3, it is also feasible to supply the electrode 12, after the ignition of the electric arc 11, with constant power and, in particular, a constant current intensity 27, over a predetermined, presettable period of time 26, whereupon the start program 22 is carried out upon expiration of the period 26. After this, constant power feeding, i.e., the welding process proper at a selected current intensity 25, is again realized. In doing so, the initial supply of the electric arc 11 with constant power, i.e., the current intensity 27 after the ignition of the electric arc 11 may differ from the supply with constant power for the welding process proper, i.e., the current intensity 25 after the start program 22. Such an application offers the advantage that the initial supply of the electrode 12 with constant power, i.e., during the period 26, causes the electric arc 11 to stabilize before the start program 22 and, after this, the welding process proper are started.

The introduction of energy during the start program 22 is preferably controlled in a manner that the mean value of the pulsed energy corresponds to the current intensity 25 for the subsequent welding process at constant power. The start program 22 can, thus, be adapted to the adjusted welding process proper.

At the welding current source 2, the parameters of the start program 22 and, in particular, the pulse parameters like pulse height, pulse width, pulse frequency, pulse break and, possibly, curve shape are freely settable, particularly via the input and/or output device 20. To this end, it is, for instance, feasible to arrange an operating element (not illustrated) at the input and/or output device 20, via which operating element the start program 22 can be activated or invoked and, if desired, subsequently amended accordingly so as to enable the automatic running of the same with the desired parameters after the ignition of the electric arc 11.

Examples of parameters for the start program 22 are:

| | |
|---|---|
| Pulsed current amplitude: | 3 A-220 A |
| Basic current amplitude: | 3 A-220 A |
| Pulse frequency: | 40 Hz-200 Hz |
| Pulse-duty factor: | 4%-50% |
| Period of time: | 0 s-10 s |

It is, of course, feasible to fix the parameters of the start program 22 independently of the control and/or evaluation device 4, or automatically. In doing so, a suitable start program 22 can be established or computed by the control and/or evaluation device 4 on grounds of stored tables, algorithms or the like, which start program is preferably fixed as a function of the parameters adjusted for the welding process proper. In doing so, it is, for instance, possible that the parameters of the start program 22 are automatically fixed or varied by the control and/or evaluation device 4 provided in the welding apparatus 1, as a function of the current intensity 25 for the welding process proper. This may be realized in various ways, for instance by reducing or increasing the current intensity 25 for the welding process by an amount or percentage change, or according to a defined algorithm. It is also feasible that the start program 22 is determined by the control and/or evaluation device 4 by inputting a material thickness or a material of the workpieces 13, 14 to be welded.

Furthermore, it is also feasible to store in the power source or welding apparatus 1 differently defined start programs 22 and, in particular, different start programs 22 having different parameters or curve shapes, which may be used or varied by the control and/or evaluation device 4 or selected by a user.

Finally, it should be noted that individual conditions or representations have been disproportionally illustrated in the previously described exemplary embodiments in order to enhance the understanding of the solution according to the invention. Moreover, individual states or representations of the previously described combinations of characteristic features of the individual exemplary embodiment in combination with other individual characteristic features from other exemplary embodiments may also constitute independent solutions according to the invention.

The invention claimed is:

1. A welding method using a non-consumable electrode comprising the following steps:
    igniting an electric arc between an electrode and a set of workpieces to be joined;
    supplying an electrode with power from a power source after said ignition of said electric arc between said electrode and said set of workpieces to be joined;
    performing a start program after igniting said electric arc but before introducing an additional material;
    wherein said electrode is supplied with pulsed energy in a form of current or voltage pulses over a presettable period of time causing a liquid melt bath to vibrate;
    performing a welding process after termination of said start program.

2. A method according to claim 1, wherein the electrode is supplied with constant power during the welding process proper.

3. A method according to claim 1, wherein the parameters of the start program and, the pulse parameters in the form of pulse height, pulse width, pulse frequency, pulse break and, curve shape are freely settable at the power source.

4. A method according to claim 1, wherein the parameters of the start program by a control device provided in the welding apparatus or in the power source are automatically fixed or varied as a function of the parameters of the welding process proper.

5. A method according to claim 4, wherein the parameters of the start program are automatically fixed or varied as a function of the amplitude of the welding current used for the welding process proper.

6. A method according to claim 4 wherein that the parameters of the start program are automatically fixed or varied as a function of the material thickness and material of the workpieces to be welded or further parameters of the welding process proper.

7. A method according to claim 4, wherein several start programs having different parameters or curve shapes are defined and stored, and that said defined and stored start programs are used by the control device to select the parameters for the start program.

8. A method according to claim 1, wherein the start program is carried out for a presettable period of time after the ignition of the electric arc.

9. A method according to claim 8, wherein during said presettable period of time after the ignition of the electric arc the electrode is supplied with constant power.

10. A method according to claim 9, wherein the electrode, during the presettable period of time after the ignition of the electric arc, is supplied with constant power different from that supplied during the welding process proper.

11. A tack welding method using a non-consumable electrode comprising the following steps:
   igniting an electric arc between an electrode and a set of workpieces to be joined;
   supplying an electrode with power from a power source after said ignition of said electric arc between said electrode and said set of workpieces to be joined;
   performing a start program after igniting said electric arc but before introducing an additional material;
   wherein said electrode is supplied with pulsed energy in a form of current or voltage pulses over a presettable period of time causing a liquid melt bath to vibrate; and
   performing a welding process after termination of said start program by supplying the electrode with constant power.

12. A method according to claim 11, wherein the introduction of power during the start program is controlled in a manner that the mean value of the pulsed power corresponds with the amplitude of the set welding current for the subsequent, constant-power welding process proper.

* * * * *